United States Patent [19]
Kunze

[11] Patent Number: 5,954,605
[45] Date of Patent: Sep. 21, 1999

[54] PULLEY

[75] Inventor: Norbert Kunze, Diez, Germany

[73] Assignee: U.S. Philips Corporation

[21] Appl. No.: 08/899,946

[22] Filed: Jul. 24, 1997

[30] Foreign Application Priority Data

Aug. 14, 1996 [DE] Germany .................. 196 32 750

[51] Int. Cl.$^6$ .................. F16H 55/36; G11B 5/54
[52] U.S. Cl. .................. 474/179; 474/176; 474/181; 360/105; 242/198
[58] Field of Search .................. 474/175, 174, 474/176, 177, 181, 182, 180; 29/892, 892.1, 892.3, 892.11; 369/270, 75.2; 360/105, 92, 94; 242/198

[56] References Cited

U.S. PATENT DOCUMENTS

| | | | |
|---|---|---|---|
| 648,834 | 5/1900 | Bierbaum | 474/177 X |
| 703,701 | 7/1902 | Hall | 474/177 X |
| 3,096,660 | 7/1963 | Spirakus | 474/179 |
| 3,764,089 | 10/1973 | Yoshida | 242/198 |
| 3,961,406 | 6/1976 | Frost et al. | 29/159 R |
| 4,496,336 | 1/1985 | Matsumoto | 474/176 X |
| 4,611,258 | 9/1986 | Schijven | 360/105 |
| 4,688,121 | 8/1987 | Castagana | 360/94 |

FOREIGN PATENT DOCUMENTS

| | | | |
|---|---|---|---|
| 4322751A1 | 7/1993 | Germany | G11B 15/26 |
| 4322751A1 | 12/1995 | Germany | G11B 15/26 |

*Primary Examiner*—Marcus Charles
*Attorney, Agent, or Firm*—Steven S. Rubin

[57] ABSTRACT

A magnetic-tape-cassette apparatus provides a pulley (1, 21, 22) for a belt drive, particularly to a flywheel for a deck of the magnetic-tape-cassette apparatus. The pulley has a groove (10) at its circumferential edge (6, 7), in which groove a drive belt (11, 27) is engageable to drive the pulley. In order to manufacture such a pulley simply and cheaply, the pulley comprises a central disc (2) and a first (3) and a second (4) end disc. The first and the second end disc are shaped along their circumferences in such a manner that they form the groove in which the drive belt is engageable.

14 Claims, 2 Drawing Sheets

PULLEY

BACKGROUND OF THE INVENTION

1. Field of the Invention

This invention relates to a pulley for a belt drive, particularly a flywheel for a deck of a magnetic-tape-cassette apparatus, the pulley having a groove at its circumferential edge, in which groove a drive belt is engageable to drive the pulley.

Such pulleys are used, for example, as flywheels in many decks of magnetic-tape-cassette apparatuses. Usually the shaft of the pulley then also forms the capstan by means of which the magnetic tape is moved from the supply roller to the take-up roller and past the magnetic head with a given speed.

2. Description of Related Art

Such a pulley is known from DE 43 22 751 A1. This known pulley comprises two separate discs each having an oblique circumferential flange, the two mirror-symmetrically joined discs with their flanges forming the circumferential groove of the drive belt. The circumferential groove for the drive belt should not rust because this would lead to soiling of the drive belt and to wow and flutter. Therefore, the discs of this known pulley should be made of a non-rusting material, for which stainless steel usually is used. During the manufacture of the pulley the discs should be joined to one another in a precisely centered manner. Centering errors during joining of the two discs result in asymmetry of the groove formed by the flanges, causing a radial and axial unbalance of the groove.

SUMMARY OF THE INVENTION

It is an object of the invention to provide a pulley of the type defined in the opening paragraph, which can be manufactured at a low cost and in a simple manner.

According to the invention this object is achieved in that the pulley comprises a central disc and a first and a second end disc, the first and the second end disc being shaped along their circumferences in such a manner that they form the groove in which the drive belt is engageable.

In such a pulley the groove is formed by the suitably shaped circumferential edges of the first and the second end disc, while the central disc serves as a substrate for mounting the end discs.

In a preferred embodiment of the invention the central disc is made of a first material, particularly a low-grade steel on which no antirust requirements are imposed, and the first and the second end disc are made of a non-rusting second material, particularly a high-grade steel.

For a correct operation of the pulley it is required that the groove in which the drive belt for driving the pulley engages is rustproof. The pulley constructed in accordance with the invention enables the central disc to be made of an arbitrary material, particularly of a non-stainless steel such as, for example, St 37, without the functionality of the groove being affected thereby. The first and the second end disc, which along their circumferences form a groove to guide the drive belt, are preferably made of a rust-proof second material, particularly a high-grade steel, and thus guarantee that the groove cannot rust. A rust-proof material or a rust-proof steel is generally more expensive than materials or steels which are not rust-proof. Since in the advantageous embodiment of the pulley in accordance with the invention not the entire pulley but only the first and the second end disc should be made of a rust-proof material, a substantial cost reduction can be obtained. The saving in cost is particularly large if, in accordance with a further advantageous embodiment of the invention, the axial dimension (i.e. width or thickness) height of the first and the second end disc is less than the axial dimension of the central disc.

If the first and the second end disc are accordingly made very thin and the central disc accordingly thicker, the pulley consists of a comparatively small proportion of the high-grade rust-proof material and a comparatively large proportion of the cheaper non-rustproof material. This results in a substantial cost saving.

The flywheel mass of the pulley is then mainly constituted by the central disc, while the first and the second end disc basically serve to form the groove for guiding the drive belt.

In a further advantageous embodiment of the invention the central disc has been glued, welded, soldered or riveted to the first and the second end disc.

However, the type of connection between the discs is not limited to these possibilities. In general, it is possible to use any type of disc connection whose strength is preserved during the life of the pulley.

In a further advantageous embodiment of the invention the first and the second end disc are V-shaped at their circumferential edge portions, the vertices of the V-shaped circumferential edge portions pointing towards one another and being substantially contiguous to one another.

A V-shape of the circumferential edge and, as a result, also a V-shape of the groove can be realized in a particularly favorable manner from the point of view of production engineering.

However, it is alternatively possible to realize other groove shapes, for example, round grooves, by accordingly adapting the shape of the circumferential edge of the first and the second end disc.

The pulley in accordance with the invention can be manufactured advantageously by means of a method which is characterized in that in a first process step the central disc is connected to the first and the second end disc by means of a connection process and, subsequently, in a second process step the end discs are shaped along their circumferences in such a manner that they form the groove for guiding the drive belt.

By means of such a method the pulley can be manufactured very cheaply and with a high accuracy of the groove. Tolerances with respect to the centering of the central disc relative to the first and the second end disc, which arise when the central disc is connected to the first and the second end disc, have no or no direct influence on the exact shape of the groove. The end discs are not shaped along their circumferences by means of the shaping process until the first and the second end disc have been fixedly connected to the central disc, as a result of which the accuracy of the groove shape depends only on the exact implementation of the shaping process but not on the connection process.

The shaping process can be realized advantageously by means of a stamping process.

The connection process can be realized advantageously by means of a gluing, welding, soldering or riveting process.

A further advantageous embodiment of the method is characterized in that a center hole of the pulley is formed in the same tool stroke as the shaping process.

Such a center hole is needed for the shaft of the pulley, which in the case of flywheels of magnetic-tape-cassette apparatuses at the same time forms the capstan. This shaft can, for example, be press-fitted, glued or welded in place.

The center hole can be made, for example, by means of a punching process. If this process is performed at the same time as the shaping process, this enables the production time and the production cost to be reduced. Moreover, it is achieved that the central disc and the circumferential groove are highly coaxial. This is particularly important in the case of flywheels for magnetic-tape-cassette apparatuses in order to achieve minimal wow and flutter.

The pulley in accordance with the invention is preferably used as a flywheel in a magnetic-tape deck or in a magnetic-tape-cassette apparatus.

BRIEF DESCRIPTION OF THE DRAWINGS

An embodiment of the invention will be described hereinafter with reference to FIGS. 1 to 5 of the drawings. In the drawings.

DETAILED DESCRIPTION OF THE PREFERRED EMBODIMENTS

Figure 1:
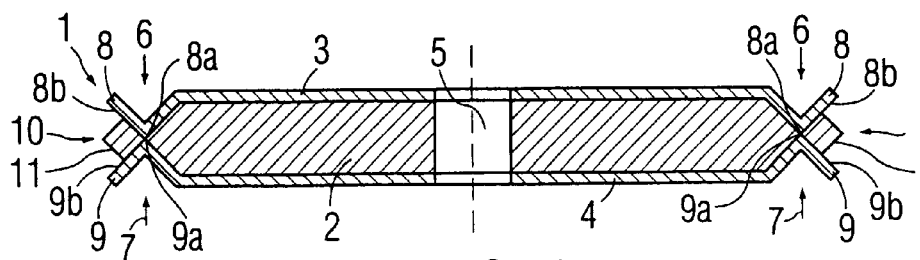
FIG. 1 shows a flywheel for a deck of a magnetic-tape-cassette apparatus, which flywheel comprises a central disc, a first and a second end disc, and a groove formed by means of the first and the second end disc.

FIG. 1 is a sectional view and shows a pulley forming a flywheel 1 for the deck of a magnetic-tape-cassette apparatus. The flywheel 1 comprises a central disc 2 as well as a first end disc 3 and a second end disc 4. The central disc 2 is preferably made of a cheap non-rusting material, particularly a non-stainless steel such as, for example, ST37, and has an outer circumference 2a. The first and the second end disc are made of a non-rusting material, particularly a high-grade steel such as, for example, ST4310. The flywheel 1 has a center hole 5 in which a flywheel shaft, not shown, can be press-fitted, glued or welded. This flywheel shaft, not shown, is generally the capstan of the magnetic-tape-cassette apparatus. The central disc 2 is immovably connected to the first end disc 3 and the second end disc 4. For this purpose, various types of joints can be used, particularly welded joints, rivetted joints, soldered joints or glued joints. The circumferential edge portions 6 and 7 of the first end disc 3 and the second end disc 4, respectively, form a first V-shaped portion 8 and a second V-shaped portion 9, respectively, which are mirror-inverted relative to one another. The vertices 8a and 9a of the first V-shaped portion 8 and the second V-shaped portion 9, respectively, are contiguous to one another. The first V-shaped portion 8 and the second V-shaped portion 9 have outwardly disposed flanks 8b and 9b, respectively. These flanks 8b and 9b form a groove 10 which entirely engages a drive belt 11.

An example of a method of manufacturing the flywheel 1 shown in FIG. 1 will be described in more detail hereinafter with reference to FIGS. 2 to 4.

For like elements the same reference numerals will be used. FIG. 2 shows the flywheel 1 in a first intermediate stage of the production process. The central disc 2 is connected to the first end disc 3 and the second end disc 4 by means of a welded, riveted, soldered or glued joint. The first end disc 3 and the second end disc 4 extend beyond the outer circumference 2a of the central disc 2 at the location of their circumferential edge portions 6 and 7, respectively. The axial thickness $T_1$ of the central disc 2 is substantially larger than the axial thicknesses $T_2$ and $T_3$ of the end discs 3 and 4.

Figure 2:
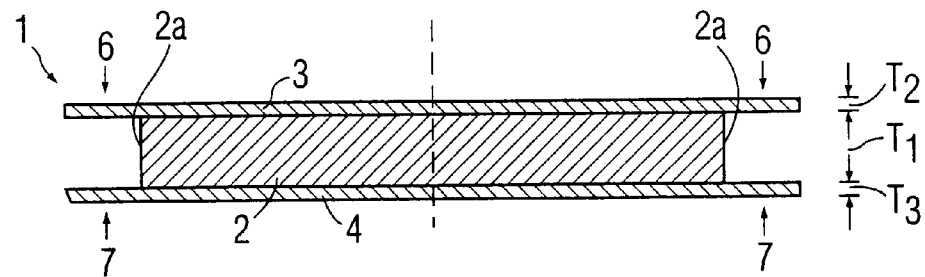
FIG. 2 shows the flywheel in an intermediate stage of a production process, the central disc being connected to the first and the second end disc but the end discs not yet being shaped at their circumferences.
Figure 3:
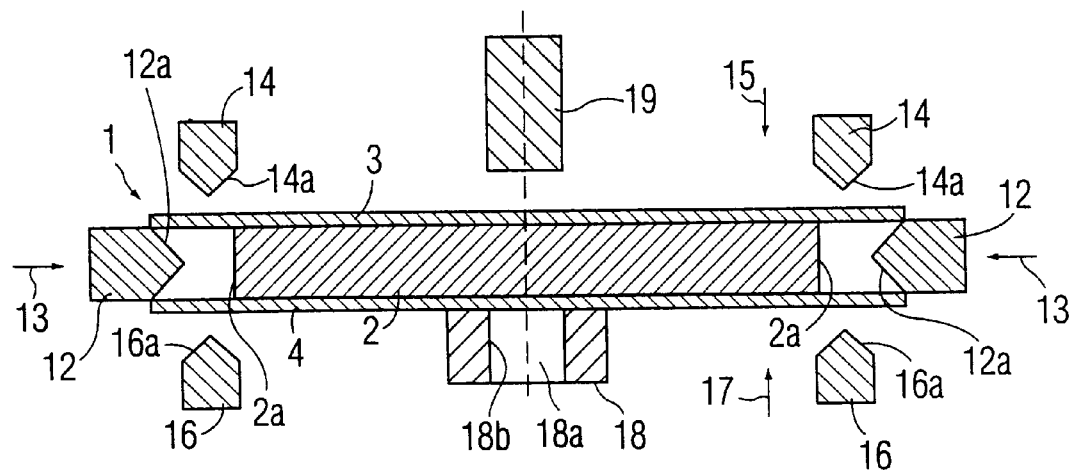
FIG. 3 shows the flywheel of FIG. 2, a stamping die being interposed between the first and the second end disc and two stamping tools being shown which do not yet act upon the end discs.

FIG. 3 shows the flywheel 1 of FIG. 2 when a stamping die 12 having a V-shaped point 12a has been moved towards the outer circumference 2a of the central disc 2 in a direction indicated by an arrow 13. The circumferential edge portions 6 and 7 of the first end disc 3 and the second end disc 4, respectively, then overlap the V-shaped point 12a of the stamping die 12. A first stamping punch 14 has a V-shaped point 14a, which is movable towards the first end disc 3 in a direction indicated by an arrow 15. A second stamping punch 16 has a V-shaped point 16a, which is movable towards the second end disc 4 in an opposite direction indicated by an arrow 17.

There has been provided a stamping die 18 having a circular die hole 18a having die hole walls 18b. There has been provided a stamping punch 19 which is movable towards the flywheel 1 in a direction indicated by the arrow 15.

Figure 4:
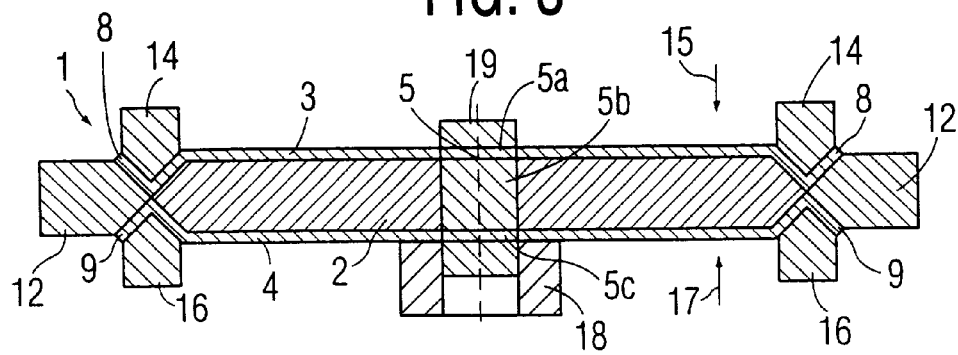
FIG. 4 shows the flywheel of FIG. 3, the two stamping tools having been applied to the end discs and having shaped the end discs along their circumferences in such a manner that form the groove.

FIG. 4 shows the flywheel of FIG. 3 when the first stamping punch 14 has been moved towards the flywheel 1 in the direction indicated by the arrow 15 and the second stamping punch 16 in the direction indicated by the arrow 17. The first stamping punch 14 and the second stamping punch 16 have then acted on the circumferential edge portions 6 and 7 of the first end disc 3 and the second end disc 4, respectively, in conjunction with the stamping die 12 in such a manner that the circumferential edge portions 6 and 7 of the first end disc 3 and the second end disc 4, respectively, have been shaped into the first V-shaped portion 8 and the second V-shaped portion 9, respectively. Simultaneously with the first stamping punch 14 and the second stamping punch 16 the stamping punch 19 has also been moved towards the flywheel 1 in the direction indicated by the arrow 15, as a result of which a center hole 5a has been punched into the first end disc 3, a center hole 5b into the central disc 2, and a center hole 5c into the second end disc 4. Thus, a through-going center hole 5 has been formed in flywheel 1.

Figure 5:
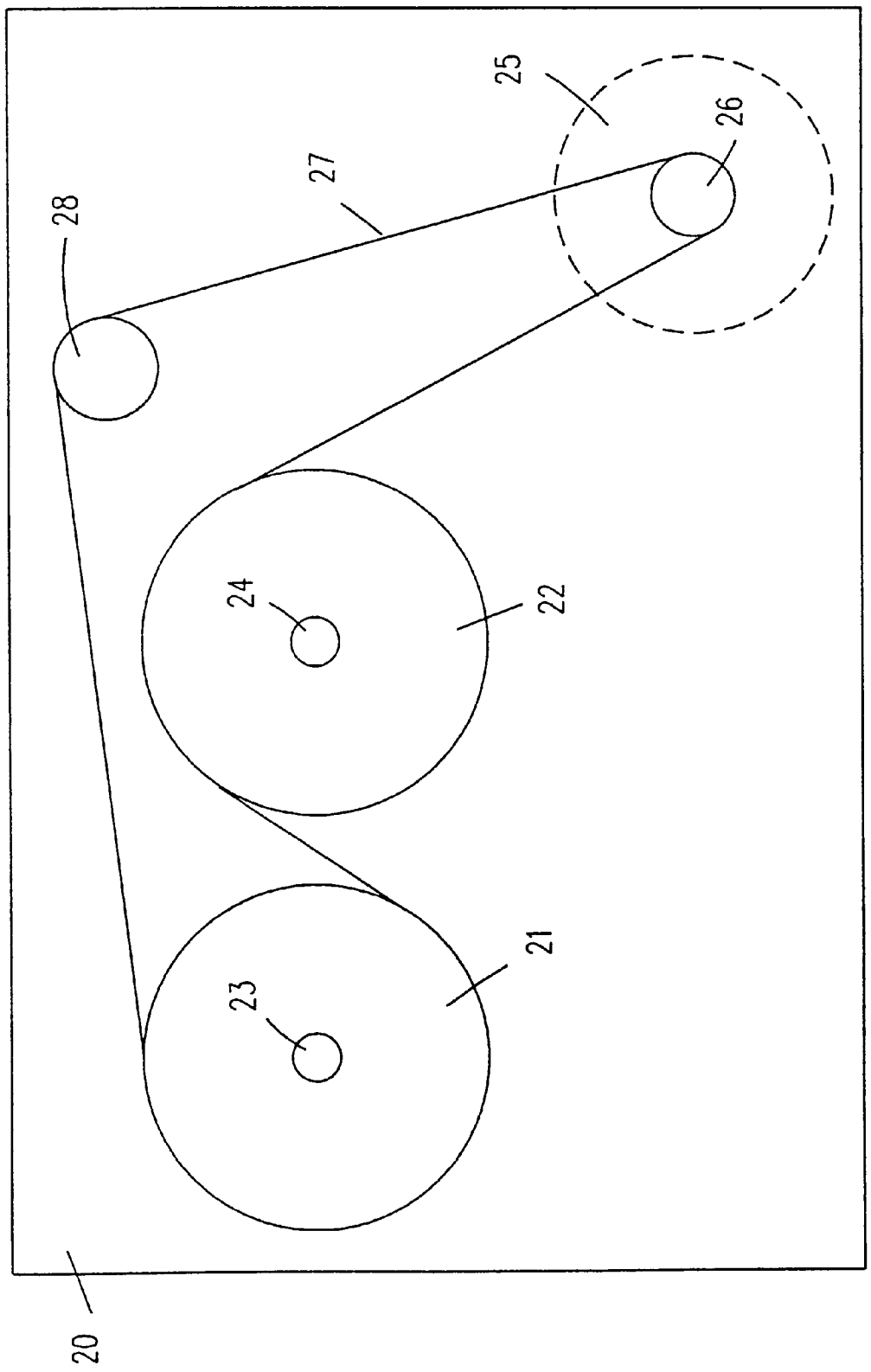
FIG. 5 shows a magnetic-tape-cassette apparatus comprising two flywheels whose shafts also form capstans, a drive belt which drives the flywheels, and a motor which drives the drive belt.

FIG. 5 shows parts of a deck of a magnetic-tape-cassette apparatus. A deck plate 20 carries a first flywheel 21 and a second flywheel 22. A first capstan 23 and a second capstan 24 have been mounted in the centers of the first flywheel 21 and the second flywheel 22, respectively. The first capstan 23 and the second capstan 24 and, consequently, the first flywheel 21 and the second flywheel 22 are rotatably supported on the deck plate 20. There has been provided a capstan motor 25, which carries a drive wheel 26. A drive belt 27 passes around the first flywheel 21 and the second flywheel 22 along an S-shaped path and also passes around the drive wheel 26 and a guide roller 28. Thus, the flywheels can be driven by means of the capstan motor 25 and the drive belt 27.

I claim:

1. A pulley for a belt drive, the pulley having a groove at its circumferential edge, in which groove a drive belt is engageable to drive the pulley, said pulley comprising:

a first end disc;

a central disc disposed on said first end disc; and a second end disc disposed on said central disc, the first and the second end disc being shaped along their circumferences in such a manner that the groove is formed only by the first and second end discs such that the drive belt engages the groove but not the central disc, said first and second end discs contacting each other only at points which define said groove and said first and second end discs contacting said central disc at all other points.

2. A pulley as claimed in claim 1, characterized in that the central disc is made of a first material, on which no antirust requirements are imposed, and the first and the second end disc are made of a non-rusting second material.

3. A pulley as claimed in claim 1, characterized in that the thickness of the first and the thickness of the second end disc are each smaller than the thickness of the central disc.

4. A pulley as claimed in claim 1, characterized in that the central disc has been glued, welded, soldered or riveted to the first and the second end disc.

5. A pulley as claimed in claim 2, characterized in that the thickness of the first and the thickness of the second end disc are each smaller than the thickness of the central disc.

6. A pulley as claimed in claim 2 wherein the circumferential edge of the central disc extends up to parts of the first and second end discs that form said groove, the first antirust material is a low-grade steel and the first and second end discs are made of a high-grade steel, and the first and second end discs are shaped so as to form a V-shaped groove for engaging the drive belt.

7. A pulley as claimed in claim 3, characterized in that the first and the second end disc are V-shaped at their circumferential edge portions, the vertices of the V-shaped circumferential edge portions pointing towards one another and being substantially contiguous to one another.

8. A pulley for a belt drive wherein the pulley has a groove at its circumferential edge, in which groove a drive belt is engageable to drive the pulley, wherein the pulley comprises a central disc and a first and a second end disc, the first and the second end disc being shaped along their circumferences in such that they form the groove, characterized in that the first and the second end disc are V-shaped at their circumferential edge portions, the vertices of the V-shaped circumferential edge portions pointing towards one another and being substantially contiguous to one another.

9. A pulley as claimed in claim 8 wherein the central disc is made of a first material having no antirust requirements, and the first and the second end disc are each made of a non-rusting second material.

10. A magnetic-tape-cassette apparatus including a pulley having a groove at its circumferential edge, in which groove a drive belt is engageable to drive the pulley, said pulley comprising:

a first end disc;

a central disc disposed on said first end disc; and a second end disc disposed on said central disc, the first and the second end disc being shaped along their circumferences in such a manner that they form a groove in which the drive belt engages only circumferential end parts of the first end disc and the second end disc;

said first and second end discs contacting each other only at points which define said groove and said first and second end discs contacting said central disc at all other points.

11. A magnetic-type-cassette apparatus as claimed in claim 10, characterized in that the central disc is made of a a low-grade steel on which no antirust requirements are imposed, and the first and the second end disc are made of a high-grade steel.

12. A magnetic-type-cassette apparatus as claimed in claim 10, characterized in that the thickness of the first and the thickness of the second end disc are each smaller than the thickness of the central disc and the first and second end discs form a sandwich construction with the central disc therebetween.

13. A magnetic-type-cassette apparatus as claimed in claim 10, characterized in that the first and the second end disc are V-shaped at their circumferential edge portions, the vertices of the V-shaped circumferential edge portions pointing towards one another and being substantially contiguous to one another.

14. A deck of a magnetic tape cassette apparatus including a pulley having a groove at its circumferential edge, in which groove a drive belt is engageable to drive the pulley, said pulley comprising:

a first end disc;

a central disc disposed on said first end disc; and a second end disc disposed on said central disc, the first and the second end disc being shaped along their circumferences in such a manner that they form a groove in which the drive belt engages only the first and second end discs;

said first and second end discs contacting each other only at points which define said groove and said first and second end discs contacting said central disc at all other points.

* * * * *